United States Patent
Byrne et al.

(10) Patent No.: US 10,255,565 B2
(45) Date of Patent: Apr. 9, 2019

(54) INTELLIGENT SPATIAL ENTERPRISE ANALYTICS

(71) Applicant: International Business Machines Corporation, Armonk, NY (US)

(72) Inventors: Brian P. Byrne, Austin, TX (US); Adam R. Holley, Austin, TX (US); Brian T. Lillie, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 536 days.

(21) Appl. No.: 15/052,410

(22) Filed: Feb. 24, 2016

(65) Prior Publication Data

US 2016/0285962 A1      Sep. 29, 2016

Related U.S. Application Data

(63) Continuation of application No. 14/670,825, filed on Mar. 27, 2015.

(51) Int. Cl.
*G06Q 10/06*    (2012.01)
*H04L 29/08*    (2006.01)
*H04L 29/06*    (2006.01)

(52) U.S. Cl.
CPC ......... *G06Q 10/0631* (2013.01); *H04L 67/10* (2013.01); *H04L 67/42* (2013.01)

(58) Field of Classification Search
CPC .............................. G06Q 10/0631; H04L 67/10
See application file for complete search history.

(56) References Cited

U.S. PATENT DOCUMENTS

| | | | |
|---|---|---|---|
| 2010/0324962 A1* | 12/2010 | Nesler | G01R 21/133 705/7.36 |
| 2012/0310559 A1 | 12/2012 | Taft | |
| 2013/0218355 A1 | 8/2013 | Lazaris | |
| 2013/0336316 A1* | 12/2013 | Sudhaakar | H04L 45/16 370/390 |
| 2013/0345999 A1* | 12/2013 | Hafen | G01R 21/133 702/60 |
| 2014/0012954 A1 | 1/2014 | Dorn et al. | |
| 2015/0186452 A1* | 7/2015 | Meng | H04L 67/1097 707/736 |

OTHER PUBLICATIONS

Ma et al; DHC: Distributed, Hierarchical Clustering in Sensor Networks, J. Comp. Sci. & Tech, Sep. 9, 2009.

* cited by examiner

*Primary Examiner* — Sujay Koneru
(74) *Attorney, Agent, or Firm* — Garg Law Firm, PLLC; Rakesh Garg; David Woycechowsky

(57) ABSTRACT

For distributed analysis of time-series data in a smart entity environment, the data is received from a data source in the environment. An overall analysis of the data is distributed to a first node in the environment. In a network operating the environment the first node is at a smaller distance from the data source as compared to a second node. A first portion of the overall analysis is performed on the data at the first node to produce a first conclusion. The first conclusion is routed to the second node. The second node performs a second portion of the overall analysis. Using the first conclusion, from the first node, a first action is caused to occur on a component of the environment. The data source is associated with the component, the data is indicative of a condition in the environment, and the component participates in the condition.

11 Claims, 7 Drawing Sheets

(PRIOR-ART)

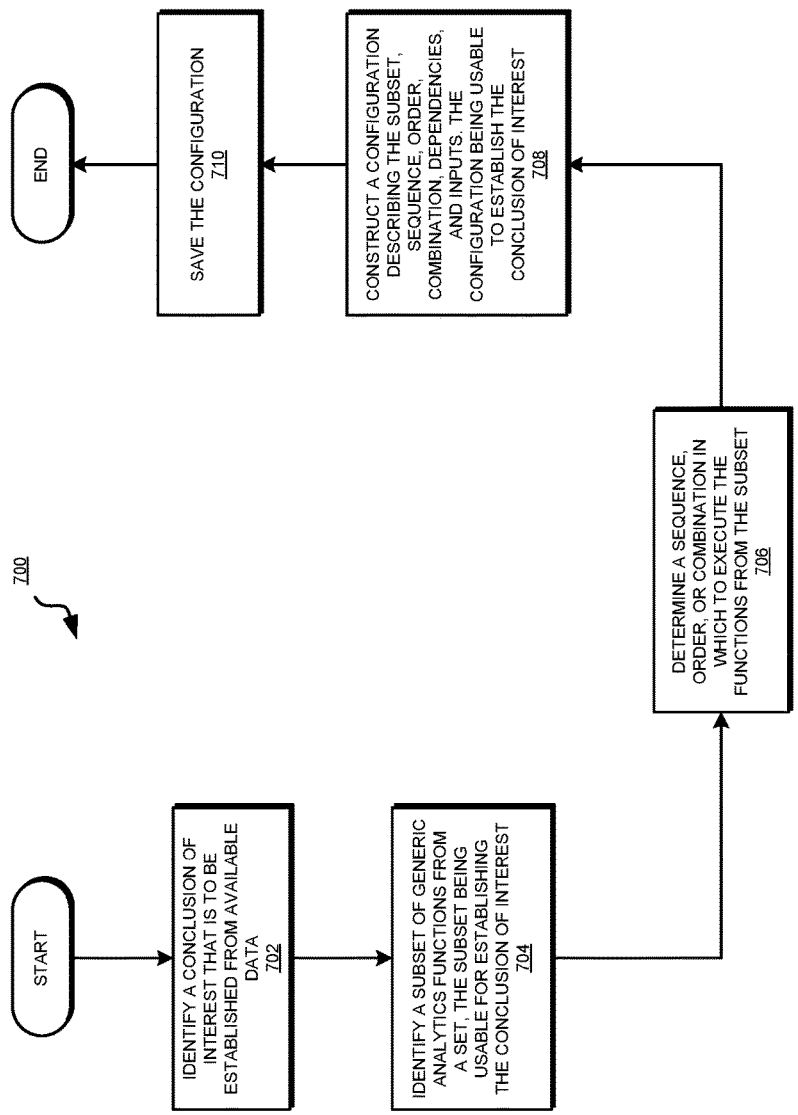

INTELLIGENT SPATIAL ENTERPRISE ANALYTICS

TECHNICAL FIELD

The present invention relates generally to a method for distributed data analysis. More particularly, the present invention relates to a method for intelligent spatial enterprise analytics for smart entity applications.

BACKGROUND

Initiatives are being implemented at buildings and structures level to city, township, district, state, and national level to achieve or increase economic growth, operational efficiency, sustainable development, and societal progress. These initiatives are commonly referred to as smart planet initiatives, smart city initiatives, smart building initiatives, and other such names (collectively referred to hereinafter as smart entity initiative or smart entity initiatives). The entities implementing these initiatives are correspondingly referred to as smart city, smart building, etc. (collectively referred to hereinafter as smart entity or smart entities).

As an example of smart city initiatives, cities are increasingly turning to analytical software systems to solve a variety of problems. The nature of these problems varies from optimizing emergency response, detecting possible issues in an electric grid, to identifying trends and patterns in citizen behavior.

Consider, as an example, the infrastructure of a city, which includes complex systems such as the electric grid and its thousands or millions of components, the traffic management system and its thousands or millions of components, and many other systems or networks.

These thousands or millions of components further include millions of sub-components that generate data of various types and for various purposes. For example, transformers in the electric grid have temperature monitoring sensors that produce and transmit transformer temperature data. This data is generated periodically, on a schedule, upon certain events, or a combination thereof.

SUMMARY

An embodiment includes a method for distributed analysis of time-series data in a smart entity environment. The embodiment receives, from a data source in the smart entity environment, the time-series data. The embodiment distributes, in the smart entity environment, an overall analysis of the data to a first analytics node, wherein in a network operating the smart entity environment the first analytics node is at a smaller distance from the data source of the time-series data as compared to a distance between the data source and a second analytics node. The embodiment performs on the time series data, at the first analytics node, a first portion of the overall analysis to produce a first conclusion. The embodiment routes the first conclusion to the second analytics node, wherein the second analytics node performs a second portion of the overall analysis. The embodiment causes, using the first conclusion, from the first analytics node, a first action to occur on a component of the smart entity environment, wherein the data source is associated with the component, wherein the time-series data is indicative of a condition in the smart entity environment, and wherein the component participates in the condition.

Another embodiment includes a computer usable program product comprising a computer readable storage device including computer usable code for distributed analysis of time-series data in a smart entity environment.

Another embodiment includes a data processing system for distributed analysis of time-series data in a smart entity environment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts a process for creating an analytics configuration for distributed analytics of data using standard form analytics functions in accordance with an illustrative embodiment.

DETAILED DESCRIPTION

Figure 1:
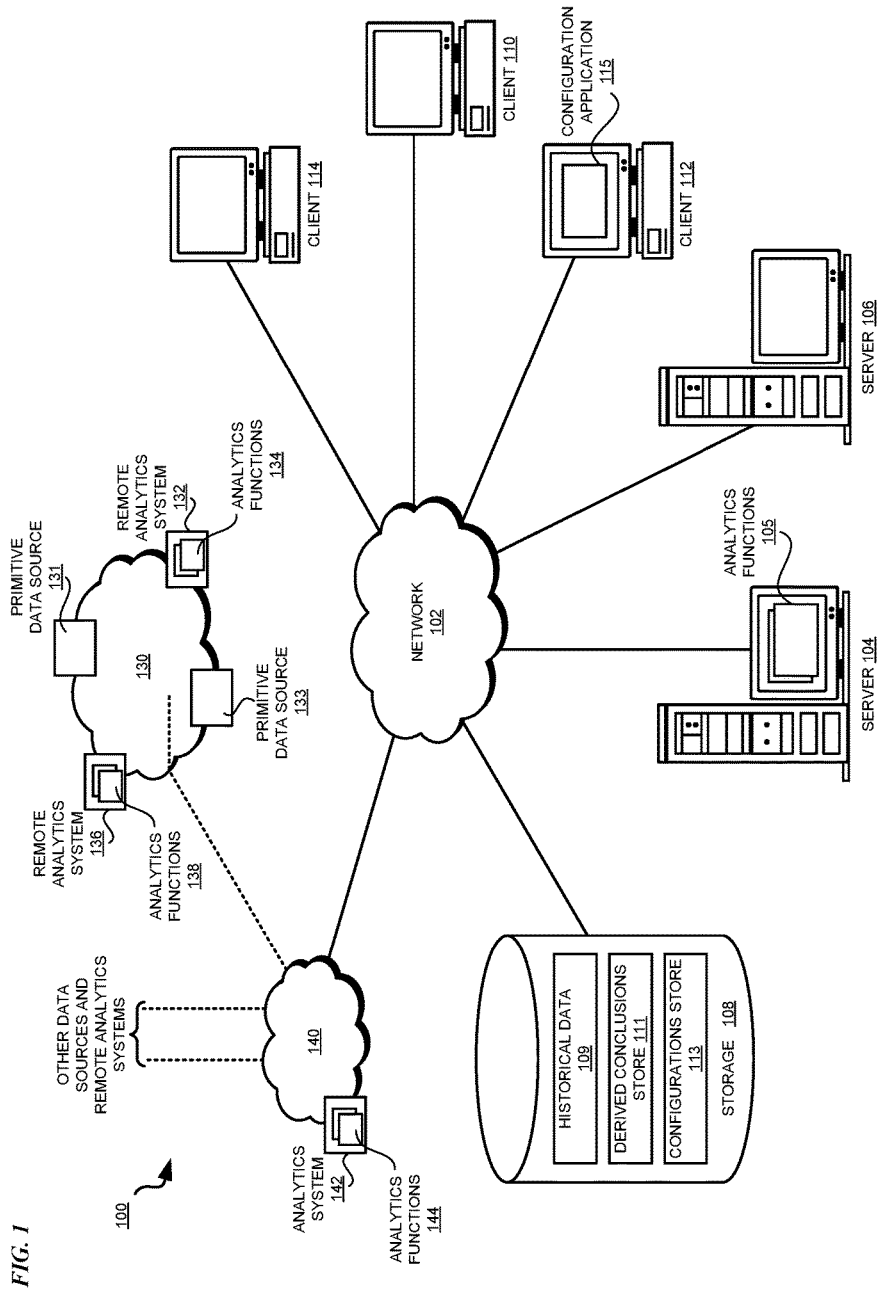
FIG. 1 depicts a block diagram of a network of data processing systems in which illustrative embodiments may be implemented.

A smart entity application is a software application including code or software instructions, which when executed by a processor using a memory, causes a function of an embodiment described herein to be performed in facilitating or improving an implementation of a smart entity initiative by a smart entity on a smart entity system. A smart entity system is a data processing system on which a smart entity application, such as an analytic agent described herein, executes. A smart entity environment is a data processing environment that includes a plurality of smart entity systems spatially distributed at differing distances from primitive data sources on which a plurality of smart entity applications execute. In the smart entity environment, zero or more smart entity systems can be interspaced between a particular primitive data source and a particular smart entity system. Primitive data sources are also a part of the smart entity environment.

Data originally emitted by a data source is called primitive data. Accordingly, the data source that produces primitive data is called a primitive data source. In statistics, signal processing, and many other fields, a primitive data is a sequence of data points—a time series—measured typically at successive times, spaced according to uniform time intervals, other periodicity, or other triggers.

An example of a primitive data source is a sensor. Some non-limiting examples of sensor-type primitive data sources include thermometers, hygrometers, timers, weight scales, barometers, current or voltage meters, flow meters, strain gauges, and many other types of transducers. Another example of a primitive data source can be an image or video capturing device, such as a camera of a suitable type. For example, an infrared camera source can produce primitive data in the form of periodic or event triggered thermal images, which from a time-series. Ordinary still-image or video cameras can also similarly behave as primitive data sources in certain configurations and can similarly produce primitive data. These examples of primitive data and primitive data sources are not intended to be limiting. From this disclosure, those of ordinary skill in the art will be able to conceive many other forms of primitive data and primitive data sources and the same are contemplated within the scope of the illustrative embodiments.

Primitive data can be analyzed to compute certain conclusions. A conclusion is essentially a result of an analysis. The conclusions can be a fact that can be established or proven by other methods, an estimated or an expected condition, a logical result, or some combination thereof.

An ordering of conclusions begins at the primitive data. A conclusion is called a higher order conclusion or a derivative conclusion, when the conclusion is derived, inferred, computed, or analyzed from the underlying primitive data, another previously computed conclusion, or some combination thereof. Some conclusions can be further analyzed to compute certain other conclusions of even higher order. Generally, the higher the order of a derived conclusion, the larger is the number of analytic steps needed to reach that conclusion from the underlying primitive data. While all conclusions are higher order than the primitive data, a conclusion can be of higher order than some conclusions but of lower order than other conclusions in the ordering of conclusions.

Analytics is the science of data analysis. An analytic function is a computation performed in the course of an analysis of supplied data and/or conclusions. An analytic model is a computational model based on a set of analytic functions. As an example, a common application of analytics is the study of operational data using statistical analysis, probability theory, operation research, other techniques, or a combination thereof, in order to discover and understand patterns, predict failures or other issues, and improve operational performance.

An analytic function specification is a code, pseudo-code, scheme, program, or procedure that describes an analytic function. An analytic function specification is also known as simply an analytic specification.

An analytic function instance is an instance of an analytic function, described by an analytic function specification, and executing in a data processing environment. For example, two copies of a software application that implements an analytic function may be executing in different data processing systems in a data processing environment. Each copy of the software application would be an example of an analytic function instance.

Analytic function instances can depend on one another, or otherwise relate to one another. For example, one instance of a particular analytic function may use as an input a conclusion, which is an output of an instance of another analytic function. The first analytic function instance is said to be depending on the second analytic function instance.

Analytic configuration, or simply "configuration" is a manner of describing the sequence, order, dependency, or other manner of combining one or more instances of one or more analytic functions, their inputs, and the conclusions resulting from such combining. In one embodiment, a configuration corresponds to code generated in a data processing system where the code invokes the analytical functions for execution in one or more data processing systems in an order according to the sequence. For example, an analytic function that is first in a configuration sequence will be invoked first, an analytic function that is second in a configuration sequence will be invoked second after the first analytic function has produced a conclusion, an analytic function that is n-th in a configuration sequence will be invoked after the (n−1)th analytic function has produced a conclusion, and so on. When a sequence spans multiple analytic functions on multiple data processing systems, those data processing systems are operated to execute their respective analytic functions according to the sequence in a similar manner.

As an example, a dependency graph can be used to represent the relationships and dependencies among analytic function instances in a configuration. The nodes in a dependency graph represent analytic function instances, and arcs connecting the nodes represent the dependencies between the nodes. An edge-graph, a tree representation, a network path diagram are some other ways of representing the relationships and dependencies among the analytic functions. Thus, by using a system of logical representations and computations, analytic functions and their instances analyze information and events that pertain to physical things in a given environment.

The illustrative embodiments are directed to solving problems encountered in implementing smart entities initiatives in smart entities, such as in smart cities. Accordingly, an example of a city infrastructure will be used to describe the various illustrative embodiments. Regardless of the nature of the problem, the approach taken by presently used analytical systems is generally the same. Presently, these systems typically gather relevant data into a centralized repository, such as an operational data store or a data warehouse. These systems then execute data mining, predictive analytics, event correlation, and other analytic techniques over the data in that repository to infer some result or conclusion upon which some action can be taken.

The inventors recognize that while these presently used systems are a step forward from the legacy systems or paper based processes used in the past, there remain some critical limitations in these presently used analytical approaches.

For example, the inventors recognize that operating the presently used analytics systems first requires consolidating all relevant data. The inventors recognize that such data consolidation poses severe limitations. For example, the consolidation step introduces latency in the analytics-based operations management process because of the time needed to copy or move the data to a central repository. Furthermore, the analytics become computationally very expensive due to potentially massive volumes of real time data feeds, e.g. sensor data or social media streams of citizens, or historical data such as transaction histories, census data, sensor data, or unstructured data. Additionally, the inventors recognize that consolidation of data is also complicated by political or governance issues, such as data sharing and ownership concerns caused by privacy regulations, competition between city agencies, and jurisdictional issues.

The inventors further recognize that presently used analytics systems also assume and depend upon continued availability and existence of the data for repeated analyses. The inventors recognize that continued retention of data becomes problematic as concerns of scale take effect. Preservable data, such as accounts information or engineering data, is often moved to archives and is not readily available to direct analysis. Some data, such as sensor time series, may be purged from the repository and become completely unavailable for future analyses. Thus, the inventors recognize that dependency on consolidated data or continued existence thereof is a serious drawback of the presently used analytics systems.

The inventors further recognize that even when all data is accumulated and made available, the presently used analytic functions are executed to compute the results at the time something requires attention. Such execution is often untimely or impractical as algorithmic complexity and data volumes increase. Often the time taken to compute a result exceeds the time window available to take action.

As another drawback of the presently used analytic systems, the inventors recognize that the presently used systems depend on specifically constructed analytics functions, which are very specifically dedicated to solve specific business problem sought to be addressed. The inventors recognize that any adaptation or changing of such custom analytics functions poses immense cost and risk exposure. The inventors are unaware of any general recognition of these problems by fellow practitioners.

The illustrative embodiments used to describe the invention generally address and solve the above-described problems and other problems related to presently used methods for data analytics. The illustrative embodiments provide a method for intelligent spatial enterprise analytics.

The illustrative embodiments describe a manner of performing intelligent spatial enterprise analytics (iSEA) to eliminate the dependency on data accumulation and persistence, and improve the timeliness or effectiveness of the results of the analytics. iSEA according to an embodiment provides a robust and scalable approach to large-scale distributed analytics.

Without implying any limitation thereto, and only for the clarity of the description, an example analytics problem is used in several places in this disclosure. That example analytics problem is, "How can a failure be predicted in the city's electrical grid?" Another example analytics problem may be, "How can a disruption be predicted in the building's water delivery infrastructure?" Another example analytics problem may be, "How can a potential delay be predicted in a branch of a service of the district?"

The inventors have recognized several drawbacks of consolidating data for analytics. An embodiment operates on remote data. Data is considered remote when the data is spatially close or proximate within a threshold distance to a source that produced the data. The embodiment performs analytics operations on data, as close to the situs of the origination of the data, and in many cases, while that data is in-flight. Data is regarded as being in-flight during the time after the data has been generated, and before the data has been stored in a repository or before the data has reached a designated or final target system.

An embodiment operates across a collection of heterogeneous computing systems over a network, such as a wide area network (WAN). For example, an embodiment deploys analytics functions, as analytics agents, spatially as close as possible to the source of primitive data. An analytics agent is executable code deployed on a data processing system or node in a network, to perform or execute an analytic function. In one embodiment, the analytic agent is programmed to perform a specific analytic function. In another embodiment, the analytic agent is programmed to receive code, message, or instructions to perform an analytic function identified or supplied in the code, message, or instructions.

The analytics functions deployed close to a data source in space or geography perform one or more generic analysis, or standard form analytics to extract derived conclusions of a certain order from the given data. Other analytics functions deployed progressively farther in space or geography from the data source perform other one or more generic analysis, or standard form analytics to extract derived conclusions of progressively higher orders from their respective inputs. Generally, the analytics functions are spatially dispersed in the enterprise environment at different spatial distances from the data sources. The term "geographical" is a spatial term, meaning physical locations of the analytics systems and their operation, physical locations of the analytics functions and their execution, or both.

An analytic function can be broken down into constituent analytic components. For example, in mathematical expressions, an analogous example of such breakdown is factoring, where a complex equation is broken down into smaller and easier computations that are often also faster to compute than the original complex equation. Similarly, an analytic function, which when given primitive data provides a final analytical answer (highest order conclusion), can be broken down into several smaller or simpler constituent analytical components. In one embodiment, a constituent analytical component implements an analytical function available in a commonly available standard analytics library.

The constituent analytical components generally produce intermediate analytical results (initial conclusions and other lower order derived conclusions). The intermediate analytical results are combinable in one or more stages of combining, to obtain other intermediate analytical results (other derived conclusions), or the final analytical answer (the highest order conclusion).

The combining of the intermediate analytical results itself can be an analytical operation of another constituent analytical component. For example, some constituent analytical components accept the primitive data and produce some intermediate analytical results, e.g., initial conclusions. The intermediate analytical results (initial conclusions and other derived conclusions) of some constituent analytical components form inputs to other constituent analytical components, which may produce additional intermediate analytical results (other derived conclusions comparatively higher up the derivation chain) to be passed on in a similar manner, or the final analytical answer (highest order conclusion).

Such an organization of constituent analytical components can be envisioned as, without implying a limitation thereto, a hierarchical tree. For example, starting from the primitive data, to a point where the final analytical answer is available, any number of constituent analytical components can be distributed therebetween, in any sequence and in any number of layers of nodes. Furthermore, a node in such a hierarchical tree itself comprises a sequence, daisy chain, or some order of constituent analytical components (collectively referred to as sequence). The sequence may arrange constituent analytical functions serially, parallel, or both.

A standard form analytic function or a general purpose analytic function is a constituent analytical component as described above. The resulting standard form analytics or general purpose analysis is an intermediate analytical result (an initial conclusion or a lower order derived conclusion) as described above.

Some examples of standard form analytics are described in this disclosure without implying a limitation thereto. The embodiment uses an analytics configuration to configure these standard form analytics functions to find a higher order conclusion of interest from the inputs available at the situs of the analytics functions. Given a conclusion that is desired from analyzing a given set of primitive data, e.g., a highest order conclusion, a set of standard form or general purpose analytic functions can be determined using a suitable method of breaking down the overall analysis into constituent analytical components. While factoring is described as one example of such a method, factoring is not intended to be limiting on the illustrative embodiments.

For example, in order to answer the problem of predicting failures in the electrical grid system, the primitive data that is relevant originates from a large number of geographically (spatially) dispersed primitive data sources. In an example small-scale grid, there might be 20 million smart meters, each sending data updates at 5 minute intervals. In addition there could be several hundred million sensors, switches, actuators and controllers involved in the system as a whole. Where presently available analytics depend on gathering all of this data into a central location for analysis, iSEA according to an embodiment inspects the data close to the source data for relevant patterns, trends or other derived conclusions or higher order conclusions.

iSEA according to an embodiment propagates the derived conclusions or higher order conclusions, optionally with the primitive data used to derive those conclusions, for further derivation of conclusions of still higher order. In one embodiment, the analytics systems to which such conclusions and data are propagated are spatially situated farther away from the primitive data sources and the analytics systems that derive the conclusions that are being propagated.

An embodiment further captures the derived conclusions. Having put in place the ability to operate through decentralized analytics agents operating over distributed data, iSEA according to an embodiment further describes a system of conclusion derivation. Returning to the example question, in order to predict failures in an electrical grid system, it is not sufficient to present all available data for systematic top-to-bottom monolithic analysis, simply because the volume of the conclusions derived therefrom is likely to overwhelm the system or human analyst that is to act upon those conclusions.

iSEA according to an embodiment derives (N+1) order conclusions from N order conclusions. Consider, for example, temperature readings for a voltage transformer as relevant data to answer the example analytics question above. An example electrical grid may contain millions of transformers each with one or more temperature sensors. Consider a set of the temperature readings from a sensor in a transformer to be the primitive data, or the first order conclusions. The example first order conclusions in this case reveal the temperature of any given transformer core at a given moment in time. An example first order action triggered by such a first order conclusion may be to activate a cooling mechanism on the transformer.

iSEA according to an embodiment derives an N+1 (in this case second) order conclusion, from this first order conclusion, for example, a rate of change of temperature with respect to time using a derivative function (dTemp/dt). The rate of change of the transformer temperature in this example forms an example second order conclusion. An example second order action triggered by such a second order conclusion may be to send a command to shutdown the transformer.

iSEA according to an embodiment further analyses these second order conclusions to further derive third and higher order conclusions. For example, perhaps a specification or historical data provides that that a temperature gradient of greater than 5 degrees per second correlates with a statistical probability of failure of 0.7 over the next 14 days of operation. As an example, such a comparative conclusion may be available by finding patterns of various rates of temperature changes in historical data and identifying that of the transformers, where the rate exceeded 5 degrees per second, seventy percent failed within a 14 day period. This probability of failure of the transformer is a third order conclusion according to an embodiment and relies on standard form pattern matching analytics function.

Because of their custom design to address specific problems only, presently available analytics methods report only the cumulative highest order conclusion. In contrast, iSEA according to an embodiment iteratively derives lowest order conclusions, and progressively increasing orders or conclusion (1, 2, 3, . . ., N, N+1, N+2 . . . ) given the primitive data or the first N order conclusions, where N can be 0 or any positive number. In other words, the prior-art reports a single level conclusion of the highest configured order whereas an embodiment is configurable to report conclusions of multiple different lower orders than the highest order of the prior-art.

iSEA according to an embodiment utilizes standard form analytics functions. From a set of standard form analytics functions, an embodiment creates a configuration of a subset of standard form analytics functions to solve a specific business problem, derive a higher order conclusion, generate an actionable conclusion, or a combination thereof. The recombination of standard form analytics functions according to an embodiment avoids having to develop large numbers of custom monolithic analytics functions as are presently used. The embodiment uses a set of standard form analytics functions, each supported by standard analytical software libraries such as SPSS (SPSS is a trademark of International Business Machines in the United States and in other countries). An embodiment flexibly combines the standard form analytics functions into analytics configurations, and distributedly deploys these configurations to address complex analytical problems over diverse data sets on a massive scale.

Without implying any limitation thereto, some example standard form analytics functions used in iSEA according to an embodiment includes analytics functions for pattern identification, root cause identification, trend identification, and optimization. The pattern identification analytics function operates by looking for instances of patterns in the available data sets or streams. In the case of the electrical grid example described above, the pattern identification analytics function identified that a temperature gradient of greater than 5 degrees per second within a specific transformer core correlated with a statistical probability of failure of 0.7 over the next 14 days of operation for a transformer. In general, pattern matching operates by referencing reference data sets, for example, raw historical data, or historical conclusions derived through data mining, and either directly identifying a corresponding case, or by statistical interpolation between known sets to derive a match.

The root cause identification analytics function is in many ways the reverse of pattern matching. This analytics function takes an outcome and infers a possible cause. Returning to the example of failure prediction in electrical grids, if a transformer core that had failed were identified, but the likely causes of the failure were not know, root cause analysis could be used to understand the patterns of factors that were present when a similar outcome was observed elsewhere. For example, likely a trend of rapidly increasing temperature cores would be evident from historical data under similar failure scenarios. Root cause analysis operates against the same repository of reference data as pattern analysis, but performs the opposite query.

Trend identification analytics function monitors a repository or stream of data for trend indicators. Trend identification does not require a prescribed trend to watch for. Trend identification watches the values of selected data properties and seeks to identify trends in these values. For example, in the example temperature data from a transformer, trend identification identifies the increasing trend of the temperature of the transformer core. Assume that the core typically has a temperature that ranges between 90-100 degrees under normal operating conditions. As the temperature sensor for the core start to report temperatures of 105, 110, 115 degrees, trend identification analytics function used in an embodiment determines two conclusions from the in-flight temperature data—(i) the current value does not match historical expectations, and (ii) the value is increasing at a rate of 5 degrees/second.

Optimization analytics function configures a defined set of variables to optimize a set of values. Optimizers, for example SPSS, operate by assessing the outcome of combinations of input variables in order to maximize or minimize an outcome. In the case of our example question of predicting failures in the electrical grid, an embodiment uses the optimization analytics function to determine the optimum grid settings to compensate for the failing transformer and still maintain the desired supply levels.

The illustrative embodiments are described with respect to certain primitive data, forms of data, data sources, locations in a distributed environment, analytics functions, configurations, patterns, trends, derived conclusions, events, rules, policies, algorithms, data processing systems, environments, components, and applications using certain smart entity initiatives in certain smart entities only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
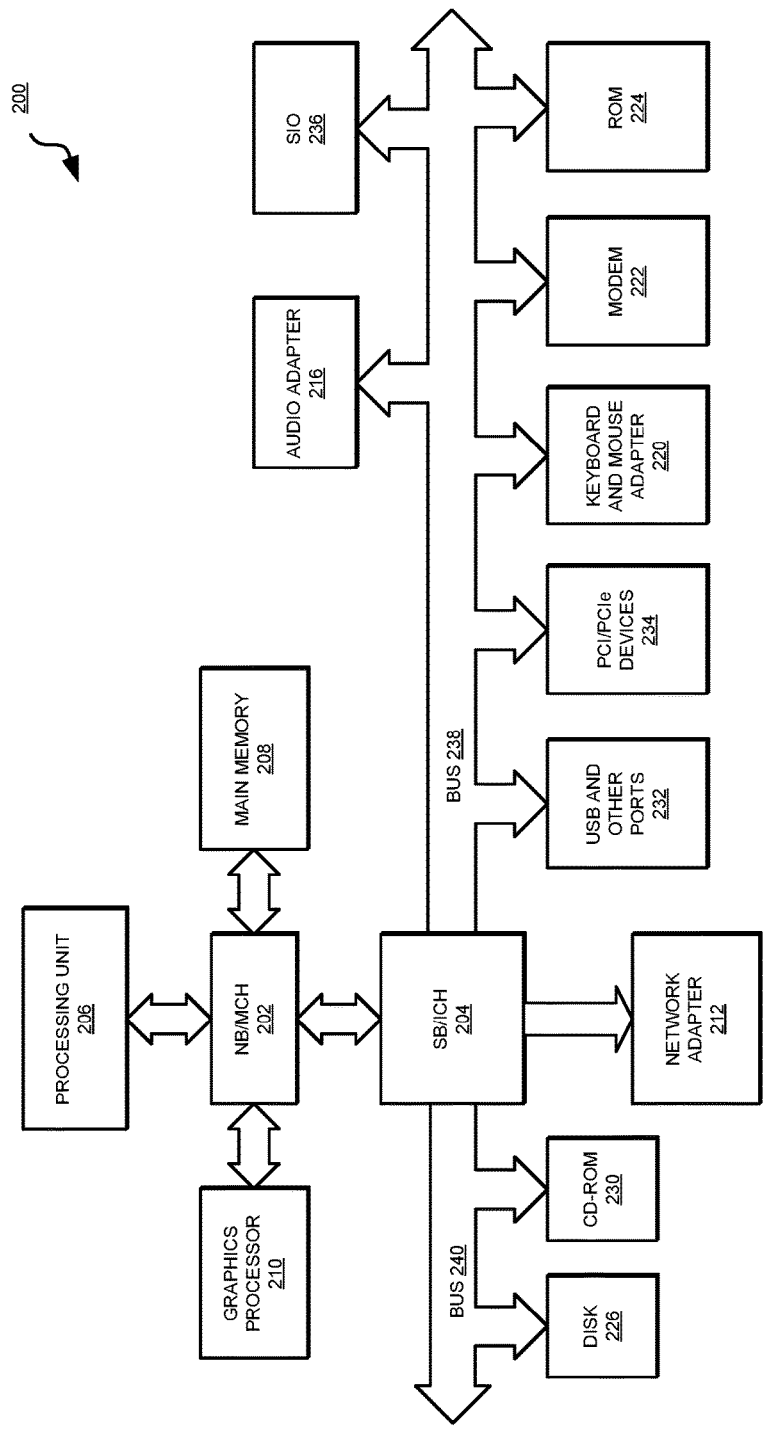
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, assume that devices and systems on network 130 are closest to data sources in the depicted example configuration of a distributed environment, devices and systems on network 140 are farther from the devices and systems on network 130, devices and systems on network 102 are farther from the devices and systems on network 140 and farthest from the data sources in the depicted distributed environment. Primitive data sources 131 and 133 are example data sources that generate primitive data. For example, in case of the example electrical grid, primitive data source 131 and 133 may be core temperature sensors at different transformers. Remote analytics systems 132 and 136 are data processing systems closest to primitive data sources 131 and 133 on network 130. According to an embodiment, remote analytics systems 132 hosts some combination of analytics functions 134 as described earlier. According to an embodiment, remote analytics systems 136 hosts some combination of analytics functions 138 as described earlier. According to an embodiment, remote analytics systems 142 on network 140 hosts some combination of analytics functions 144 as described earlier. According to an embodiment, server 104 hosts some combination of analytics functions 105 as well. Storage 108, or one or more equivalents thereof, hosts historical data 109, acts as a store or repository 111 for derived conclusions, and acts as a store or repository 113 for analytics configurations. Configuration application 115 in client 112 is usable for creating or modifying configurations in configurations store 113.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114, or systems 132, 136, or 142 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as analytics functions 105, 132, 138, 142, and configuration application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
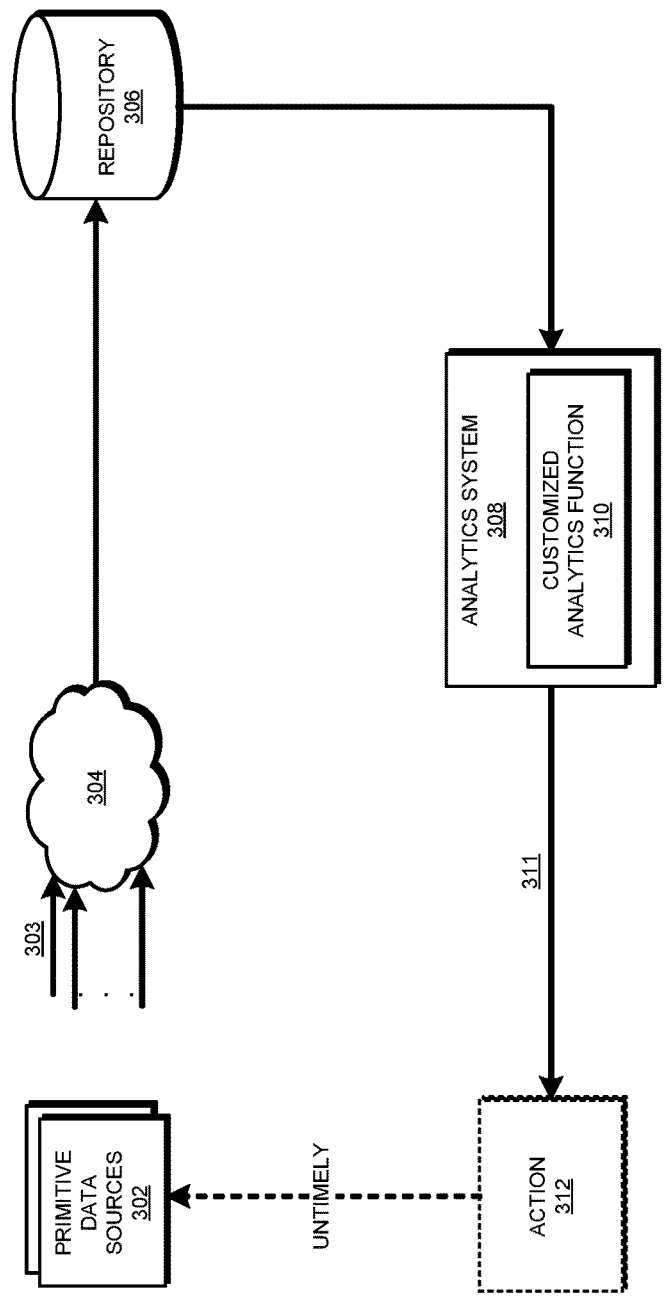
FIG. 3 depicts a block diagram of a presently used configuration for data analysis that can be improved by an illustrative embodiment.

With reference to FIG. 3, this figure depicts a block diagram of a presently used configuration for data analysis that can be improved by an illustrative embodiment. Primitive data sources 302 are similar to primitive data sources 131 and 133 in FIG. 1. Network 304 is similar to a combination of networks 102, 130, and 140 in FIG. 1.

Presently, sources 302 send data 303 over network 304 for accumulation or consolidation in repository 306. Customized analytics function 310 in analytics system 308 analyzes the consolidated data from repository 306 to generate conclusion 311. Conclusion 311 is passed to action entity 312 for taking any action responsive to conclusion 311.

Presently, as shown in FIG. 3, and as described earlier, often the action is untimely owing to time needed for the significant computational burden from analyzing accumulated data. Conclusion 311 can be confusing, overwhelming, or both owing to the amount of data over which the analytics are performed. Accumulating data in repository 306 can be problematic for the various reasons described earlier.

Figure 4:
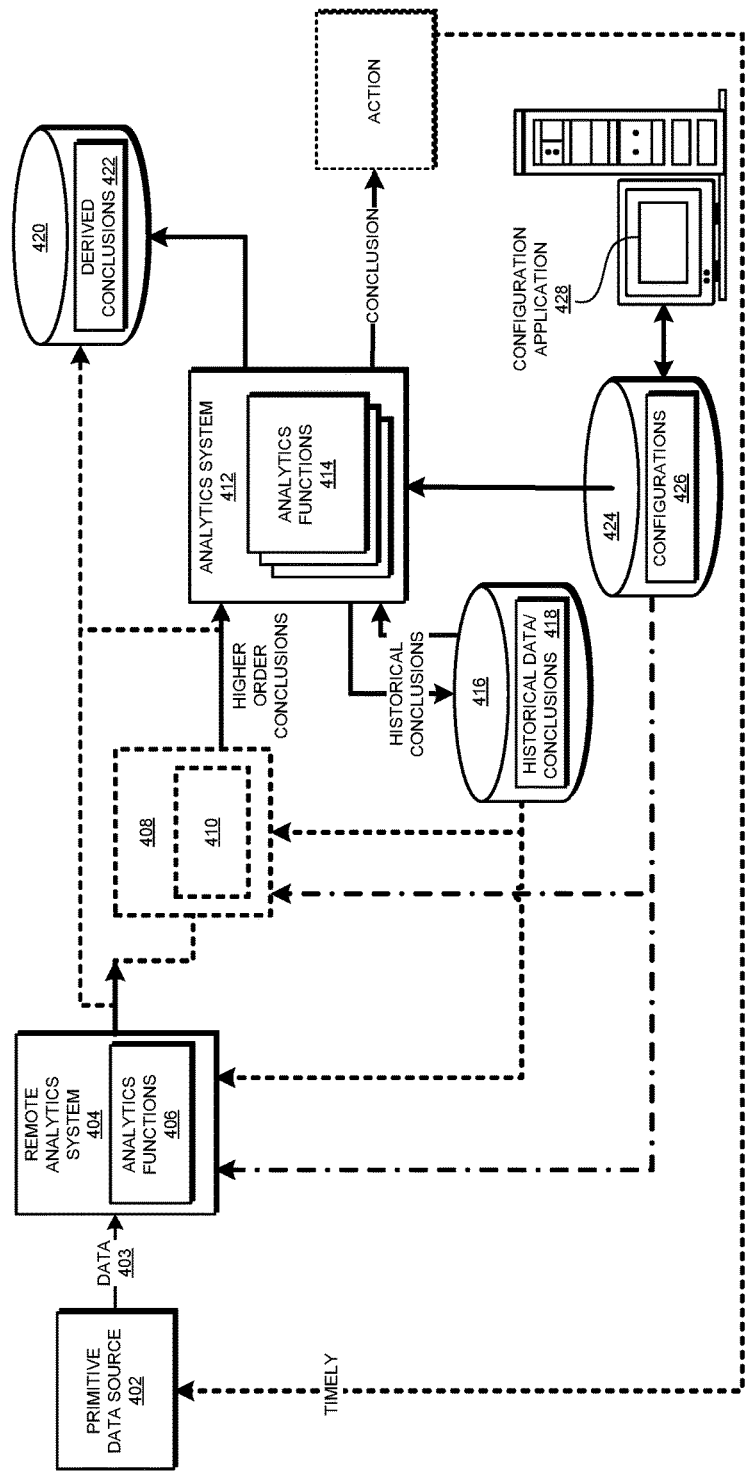
FIG. 4 depicts an example distributed iSEA configuration according to an illustrative embodiment.

With reference to FIG. 4, this figure depicts an example distributed iSEA configuration according to an illustrative embodiment. Distributed enterprise environment 400 comprises an enterprise of numerous devices, equipment, and system that produce data, and numerous analytical systems or nodes distributed throughout the enterprise for analyzing the produced data. Primitive data source 402 is an example primitive data source in primitive data sources 302 in FIG. 3, such as primitive data source 131 in FIG. 1.

Assume, as an example, that remote analytics system 404 is similar to remote analytics system 132 in FIG. 1, and includes some standard form analytics functions 406 in the manner of analytics functions 134 in FIG. 1. Further assume that remote analytics system 408 represents one or more remote analytics systems placed at different proximities from primitive data sources 402, similar to remote analytics system 142 in FIG. 1. Such one or more remote analytics systems 408 include various standard form analytics functions 410 in the manner of analytics functions 144 in FIG. 1. Assume that analytics system 412 is similar to server 104 in FIG. 1, and includes some standard form analytics functions 414 in the manner of analytics functions 105 in FIG. 1.

Repository 416 stores and supplies historical data 418, to one or more of analytics systems 404, 408, and 412, such as to perform analysis for finding patterns or trends for comparison patterns, trends, or other conclusions based on current data 403. Historical data 418 is also usable for determining optimization settings or root cause for use with a current condition in the enterprise environment where source 402 is operating.

Repository 420 stores derived conclusions 422 from one or more of analytics systems 404, 408, and 412. Repository 424 stores analytics configurations 426 and supplies them to one or more of analytics systems 404, 408, and 412, such as for configuring a sequence, order, or combination of analytics functions 406, 410, and 414, respectively.

Configuration application 428 is operable to create or modify a configuration in configuration 426. In one embodiment, configuration application 428 is operated by a human analyst. The analyst identifies a conclusion (of any order) that is of interest and is to be determined in the enterprise. The analyst identifies a sequence, order or combination of analytics functions and inputs that are needed to derive that conclusion from current data 403. The analyst creates an analytics configuration using configuration application and stores it in configurations 426. In another embodiment, a machine, such as an artificial intelligence system, can be programmed to identify higher order or derivative conclusions from given data, create or modify analytics configurations to derive those conclusions from given data 403 autonomously without the assistance of a human analyst.

Because of the distributed nature of the analytics, an actionable conclusion can result from any analytics processing in any analytics system. For example, analytics system 404 could generate a result that could result in an action upon a device or system associated with data source 402 to make any adjustments, changes, or corrections therein. Such action would be significantly faster as compared to any action taken by action entity 312 in FIG. 3. The improved speed results from the proximity of the system wherein the actionable conclusion is computed to the device on which the action is to be taken, the significantly reduced data that participates in the computation of the actionable conclusion, or both. For example, even if the actionable conclusion were computed at the farthest node, e.g., system 412, the conclusion will have been computed much faster owing to the significantly less raw data that is propagated up to system 412, other downstream systems having performed several intermediate-order conclusion-findings, or both.

Figure 5:
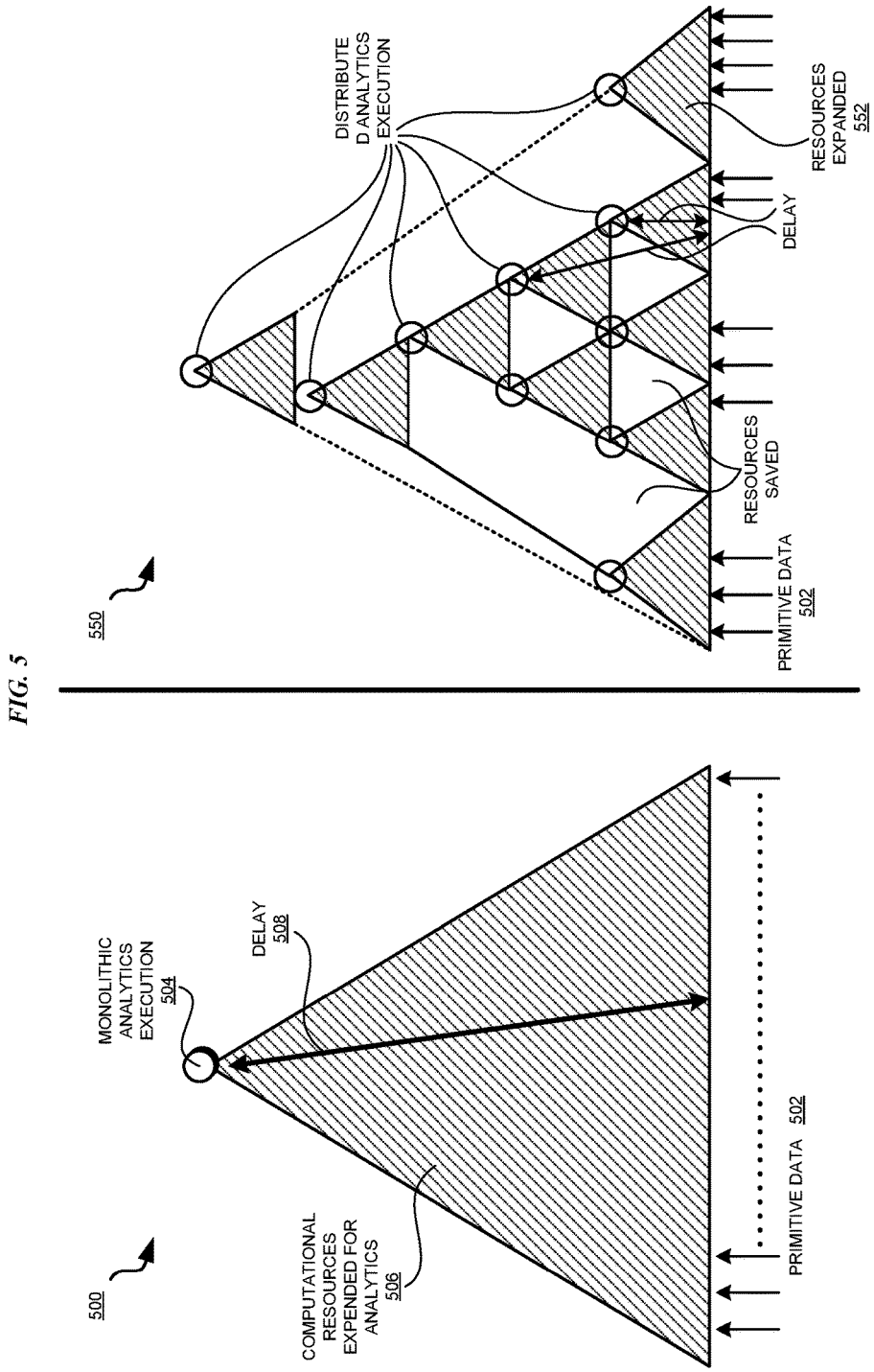
FIG. 5 depicts a representative illustration of speed and cost advantages of iSEA in accordance with an illustrative embodiment.

With reference to FIG. 5, this figure depicts a representative illustration of speed and cost advantages of iSEA in accordance with an illustrative embodiment. Graph 500 represents the computation cost and the speed (delay) of the actionable conclusions in a presently used custom monolithic analytics configuration, such as using system 308 with customized analytics function 310 in FIG. 3.

Primitive data 502 includes data 403 in FIG. 4, and similar data from all other data sources. All primitive data 502 is accumulated and consolidated in a repository, such as in repository 306 in FIG. 3. Apex 504 represents the monolithic analytics execution on consolidated primitive data 502. Area 506 represents the amount of computational resources expended to apply monolithic analytics execution 504 to consolidated primitive data 502. Distance 508 between primitive data 502 and apex 504 represents the delay in arriving at the analytical result and taking an action.

Graph 550 represents the computation cost and the speed (delay) of the actionable conclusions in an iSEA configuration according to an embodiment, such as using systems 404, 408, and 412 with subsets of standard form analytics functions 406, 410, and 414, respectively, in FIG. 4.

Same primitive data 502 that was applied in graph 500 is applied in graph 550. Because analytics nodes or systems are distributed closer to the data sources, each node or system only handles a portion of primitive data 502 that originates from only some of the primitive data sources. A smaller triangle, e.g., triangle 552 represents, for example, the relative proximity of the analytics node to the data source, and the relatively smaller amount of computational resources expended to derive higher order conclusions from the portion of primitive data 502 that forms the base of the smaller triangle.

Analytics nodes or systems at various distances in the distributed processing environment are represented as the apexes of the smaller triangles at different layers of the smaller triangles. The derived conclusions are passed from the apex of a smaller triangle of one layer to the base of a smaller triangle in another layer. Propagation of derived conclusions for further higher order conclusions derivation in this manner is much more compact as compared to the volume of the entirety of raw primitive data 502.

The shaded spaces within the smaller triangles together represent the computational resources expended in an iSEA configuration according to an embodiment. The empty spaces in the outer triangle of graph 550 that is not shaded represents the computational resources saved by using an iSEA configuration according to an embodiment. Distances 554 and 556 represent the comparatively smaller delays in reaching actionable conclusions by using an iSEA configuration according to an embodiment.

Figure 6:
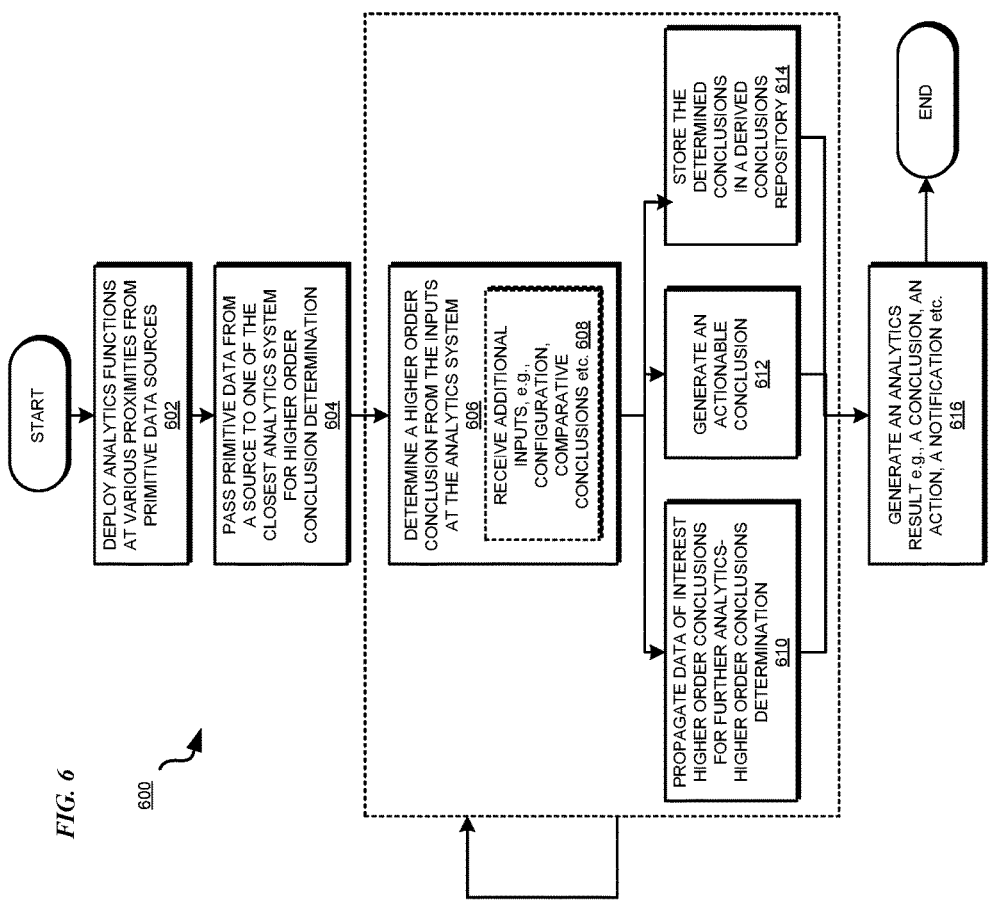
FIG. 6 depicts a flowchart of a process for distributed analytics using standard form analytic functions in an iSEA configuration according to an illustrative embodiment.

With reference to FIG. 6, this figure depicts a flowchart of a process for distributed analytics using standard form analytic functions in an iSEA configuration according to an illustrative embodiment. Process 600 can be implemented in a distributed enterprise environment such as environment 400 in FIG. 4.

The iSEA configuration deploys analytics functions at various proximities from the primitive data sources operating in the environment (block 602). An analytics system closest or sufficiently close to a primitive data source in the iSEA configuration receives the primitive data of the source for determining a higher order conclusion from that data (block 604).

The higher order conclusion derived at block 604 becomes an input to another analytics system in the iSEA configuration. Additional inputs, such as primitive data of interest, comparative conclusions or data from a historical data repository, and one or more analytics configurations may also be additional inputs to such other analytics system. Using the conclusions determined at an analytics system downstream, such as at block 604, and other inputs as needed, another analytics system at a different location in the distributed iSEA configuration further determines another higher order conclusion (block 606).

The analytics system can propagate any raw data that may be of interest (useful for analysis at a later stage) and the conclusions derived at the analytics system for further higher order conclusions determination to another analytics system (block 608). Alternatively, or together with block 608, the analytics system can also generate an actionable conclusion under certain circumstances (block 610). Alternatively, or together with blocks 608 and/or 610, the analytics system can also store the determined conclusion in a derived conclusions repository (block 612). Although not shown in process 600, the analytics system at block 604 can also generate actionable conclusions and/or store the derived conclusion in the repository in a similar manner.

The iSEA configuration allows the combination of blocks 606, 608, 610, and 612 to repeat at many times as needed to reach the desired derived conclusion at any level in the distributed enterprise environment. The iSEA configuration produces or generates the desired derived conclusion as the analytics result of the analytics processing (block 614). The analytics result can take the form of a conclusion or a conclusion, and can cause an action to be taken or notification to be sent in the distributed enterprise environment. The configuration ends process 600 thereafter or returns to block 604 for another conclusion determination.

With reference to FIG. 7, this figure depicts a process for creating an analytics configuration for distributed analytics of data using standard form analytics functions in accordance with an illustrative embodiment. Process 700 can be implemented in configuration application 428 in FIG. 4.

The application identifies a conclusion that is of interest and is to be established from available data (block 702). The application identifies, from a set, a subset of generic analytics functions, e.g., standard form analytics functions described earlier and other similarly available functions implementing commonly used analytical computations (block 704). The subset of generic analytics functions is usable for establishing the conclusion of interest.

The application determines a sequence, order, or combination in which to execute one or more instances of the analytics functions in the subset (block 706). The application constructs an analytics configuration describing the sequence, order, or combination in which to execute one or more instances of the analytics functions, together with their dependencies and inputs (block 708). The analytics configuration is usable for executing the analytics functions at an analytics system or node and establishing the conclusion of interest.

The application saves the analytics configuration, such as in configuration store 424 in FIG. 4 (block 710). The application ends process 700 thereafter or returns to block 702 for creating another analytics configuration.

Thus, a computer implemented method is provided in the illustrative embodiments for intelligent spatial enterprise analytics. While some embodiments are described with respect to some example smart city initiatives, such descriptions and such example initiatives are not intended to be limiting on the illustrative embodiments. From this disclosure, those of ordinary skill in the art will be able to conceive many other smart entity initiatives, and adaptations of one or more embodiments to such other initiatives, and the same are contemplated within the scope of the illustrative embodiments.

For example, some embodiments are described using a temperature sensor data source producing temperature readings time-series in a smart electric grid. In a similar manner, an embodiment can be adapted to process traffic light time-series. For example, a sensor at the traffic light may generate a time-series of the traffic light states. A first order analysis may result in a first order conclusion that the light might have a malfunction. Accordingly, a first order action from an embodiment might create an action for a technician to repair the light or policeman to direct traffic. A higher order conclusion might predict the traffic that might result from the malfunctioning light, and a higher order action might cause a diversion strategy to be deployed for diverting the traffic away from the malfunctioning light.

As another example, a flow sensor in a water main might produce a time-series of water flow data. A low order analysis close to the sensor might compute a low order conclusion that there might be a leak in the water system. A low order action might shutdown a section of the pipeline for repairs. A higher order conclusion might be that population affected by the leak as well as the population serviced by an alternate pipeline which will bear a heavier load due to diversion has to be notified. A still higher order conclusion might find that an inventory level of a needed spare part is below a threshold and produce a re-order parts action for a supplier.

Where an embodiment or a portion thereof is described with respect to a type of device, the computer implemented method, system or apparatus, the computer program product, or a portion thereof, are adapted or configured for use with a suitable and comparable manifestation of that type of device. For example, an embodiment may be implemented in a mobile device, such as a tablet or a smartphone device. It is contemplated within the scope of the illustrative embodiments that such a mobile device may travel proximate to a data source, and load and execute an analytic agent suitable for that location in a manner described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for distributed analysis of time-series data in a smart entity environment, the method comprising:
  receiving, from a data source in the smart entity environment, the time-series data, wherein the data source is a sensor associated with a component of the smart entity environment;

distributing, in the smart entity environment, an overall analysis of the data to a first analytics node, wherein in a network operating the smart entity environment the first analytics node is at a smaller distance from the data source of the time-series data as compared to a distance between the data source and a second analytics node;

performing on the time series data, at the first analytics node, a first portion of the overall analysis to produce a first conclusion, wherein the first conclusion is a temperature associated with the component;

routing the first conclusion to the second analytics node, wherein the second analytics node performs a second portion of the overall analysis;

causing, using the first conclusion, from the first analytics node, a first action to occur on the component of the smart entity environment, wherein the data source is associated with the component, wherein the time-series data is indicative of a condition in the smart entity environment, wherein the component participates in the condition, and wherein the first action includes activating a cooling mechanism of the component;

routing, in addition to the first conclusion, the time series-data to the second analytics node;

performing, by the second analytics node using a derivative function, the second portion of the overall analysis to produce a second conclusion using the first conclusion and the time-series data as inputs, wherein the second conclusion includes a rate of change of the temperature associated with the component;

causing, using the second conclusion, from the second analytics node, a second action to occur in the smart entity environment, wherein the second action is responsive to the condition in the smart entity environment, wherein the second action includes sending a command to shutdown the component; and performing, using a pattern matching analytics function, a third portion of the overall analysis to produce a third conclusion using the second conclusion, wherein the third conclusion includes a statistical probability of failure over a period of time associated with the component.

2. The method of claim 1, further comprising:
routing the second conclusion to a third analytics node in the smart entity environment, wherein the third analytics node performs the third portion of the overall analysis.

3. The method of claim 2, wherein the first portion, the second portion, and the third portion together form the overall analysis.

4. The method of claim 1, wherein the first analytics node comprises a first data processing system and the second analytics node comprises a second data processing system, further comprising:
spatially locating, in the smart entity environment, the first data processing system at a smaller physical distance from the data source as compared to a physical distance between the data source and the second data processing system.

5. The method of claim 1, further comprising:
configuring the first analytics node with a first sequence of standard form analytics functions to compute the first conclusion;
configuring the second analytics node with a second sequence of the standard form analytics functions to compute a second conclusion.

6. The method of claim 5, further comprising:
changing the first sequence to a third sequence, the third sequence configuring the first analytics node to compute the third conclusion from the time-series data using the standard form analytics functions.

7. The method of claim 1, further comprising:
identifying the first conclusion as a first conclusion of interest;
identifying a first subset of a set of standard form analytics functions as being usable to compute the first conclusion of interest;
determining an order of execution of at least one instance of at least one standard form analytics function in the first subset;
determining a dependency between the at least one instance of the at least one standard form analytics function and at least one instance of at least one other standard form analytics function in the first subset;
describing the order of execution and the dependency in a first analytics configuration;
loading the first analytics configuration at the first analytics node; and
configuring, using the first analytics configuration, the first analytics node to compute the first conclusion.

8. The method of claim 7, further comprising:
identifying the second conclusion as a second conclusion of interest;
identifying a second subset of the set of standard form analytics functions as being usable to compute the second conclusion of interest;
determining an order of execution of at least one instance of at least one standard form analytics function in the second subset;
determining a dependency between the at least one instance of the at least one standard form analytics function and at least one instance of at least one other standard form analytics function in the second subset;
describing the order of execution and the dependency in a second analytics configuration;
loading the second analytics configuration at the second analytics node; and
configuring, using the second analytics configuration, the second analytics node to compute the second conclusion.

9. The method of claim 8, further comprising:
saving the first analytics configuration and the second analytics configuration in a configurations repository.

10. The method of claim 1, further comprising:
storing the first conclusion and the second conclusion in a derived conclusions repository.

11. The method of claim 1, further comprising:
deriving, during the second portion of the overall analysis on historical data from a historical data repository, a comparative conclusion; and
using the comparative conclusion in the second portion of the overall analysis to cause a second action from the second analytics node in the smart entity environment, wherein the causing the second action is responsive to determining that the second conclusion and the comparative conclusion are different according to a criterion.

* * * * *